Dec. 14, 1948.　　　K. D. PRIESTLEY　　　2,456,083
IRRIGATION RIDGE BLOCKER
Filed Feb. 9, 1945
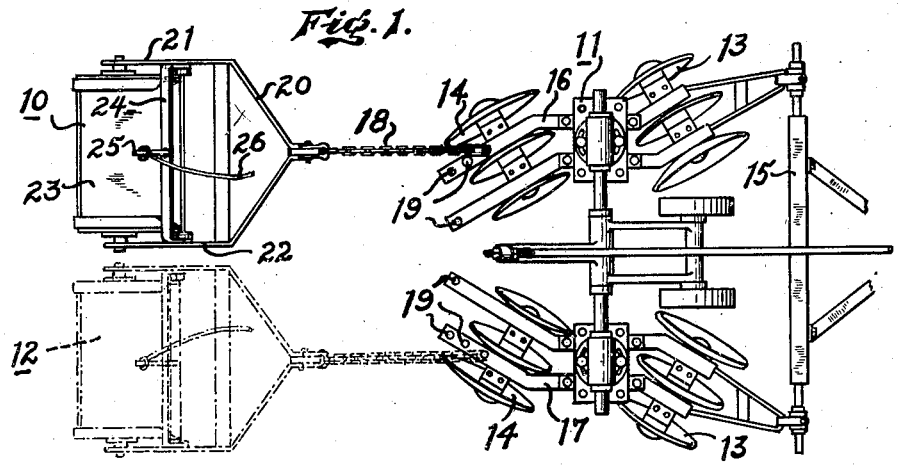
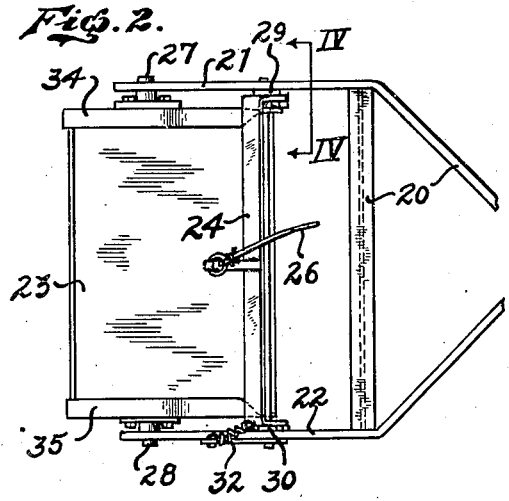
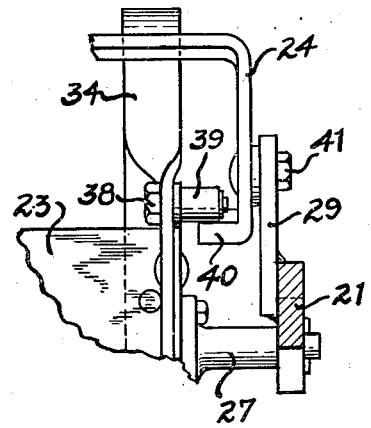
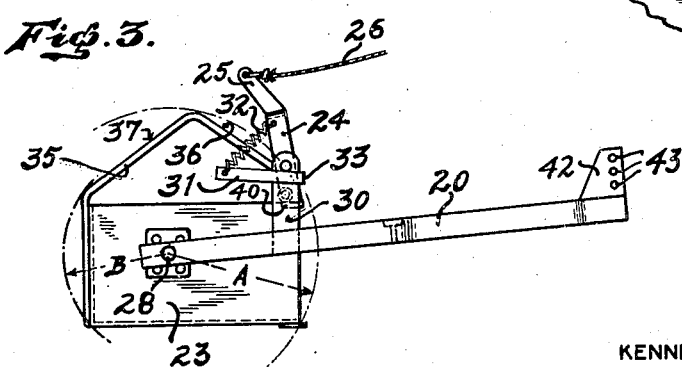
INVENTOR.
KENNETH D. PRIESTLEY.
BY
*Wm. H. Atkinson*
ATTORNEY.

Patented Dec. 14, 1948

2,456,083

UNITED STATES PATENT OFFICE 2,456,083

IRRIGATION RIDGE BLOCKER

Kenneth D. Priestley, Campbell, Calif.

Application February 9, 1945, Serial No. 577,064

2 Claims. (Cl. 37—140)

My present invention relates to irrigation apparatus, and more particularly to a blocker suitable for use with ridging plows, such as are employed to cast up ridges as a border about predetermined areas, as practiced in contour irrigation. The blocker which forms the subject matter of this application has been designed for and will be found particularly adapted for use with an irrigation ridger of the type covered by my prior Patent No. 2,286,305, issued June 16, 1944 and entitled Irrigation ridger.

A feature of my above referred to irrigation ridger resides in the fact that the earth turning elements thereof float about a transverse and longitudinal axis in such a manner that the several elements follow closely the contour of the surface upon which a ridge is to be formed and, therefore, it is a primary object of my present invention to provide a ridge blocker which will operate satisfactorily and at the same time not interfere with a free surface following movement of the earth engaging elements of an irrigation ridger, whether it be of the aforementioned type, or of another type.

Another object of the invention is to provide an earth gathering blocker for use with a ridging plow which may be easily operated at either side of a ridge formed by the plow, or which may be used in pairs to operate simultaneously on each side of a ridge so formed.

Another object of the invention is to provide an improved earth gathering blocker for an irrigation ridge forming machine which will have improved operating characteristics that are brought about by controlling the dumping of the bucket and resetting same in a new and novel manner.

Another object of the invention is to provide an improvement in an earth gathering blocker for irrigation ridgers in which the earth gathering bucket is positively latched at both sides by a single pivotally mounted latch bar.

Another object of the invention is to provide a new and improved latch for a drag line bucket of the type described which will avoid the distorting strains that are prevalent in the prior art devices of this character having only a single latching means at one side thereof.

Other objects and advantages of my invention will be in part evident to those skilled in the art, and in part pointed out hereinafter in the following description taken in connection with the accompanying drawing, wherein there is shown by way of illustration and not of limitation a preferred embodiment of the invention.

In the drawing:

Figure 1 is a plan view showing my improved blocker as attached to the trailing end of an irrigation ridger of the type covered by my aforementioned patent, Figure 2 is an enlarged plan view of the blocker shown in Figure 1 of the drawing, Figure 3 is a side elevation of the blocker shown in Figure 2 of the drawing, and Figure 4 is a fragmentary view showing details of the latching means contemplated by this invention.

In practicing the art of irrigation with apparatus of the type contemplated by my present invention it is the custom to provide a network of earth mounds or ridges which will operate as dams to retain or direct the flow of irrigation water to particular areas, as will be determined by the contour of the terrain to be irrigated. In the formation of these earth mounds or ridges it often happens that the ridges will intersect, and in that case it will be seen that the irrigation ridger or plow will pass through and break any previously formed dam or ridge as it passes thereover in turning up the earth for the ridge then in the process of being formed. This, therefore, presents the objection that wherever two ridges cross each other there will be an interruption at their points of intersection which, at the present time, is generally repaired by manual labor through the use of shovels, hoes or like implements. And while others have proposed the use of various devices as a blocking means for these breaks in the dams or ridges, they have not been altogether satisfactory for the reason that in their dumping action they do not dump their contents in a satisfactory and effective manner, nor are they capable of recovering their earth gathering function quickly enough to collect sufficient earth for a subsequent operation, which may become necessary after only a short distance of travel, such as has been found possible with a blocker constructed in accordance with my present invention.

In Figure 1 of the drawing I have shown my improved blockers, designated generally by the numeral 10, as connected to one side of a ridging plow 11 constructed in accordance with my above identified patent. In this figure there is also shown, by dot and dash lines, the outline of a second similar blocker 12 which may be connected to the other side of the ridging plow 11. As described in my previous patent, the ridging plow 11 has earth gathering elements or discs 13 and 14 that are arranged in trailing relation at the opposite ends of a draft or drawbar 15. An additional feature of this ridger is that it has side frames 16 and 17 which are laterally adjustable to vary their earth gathering angle and also the spacing therebetween, all of which will be determined by the nature and size of the ridge to be formed. Because of these features, I have shown my blocker 10 as connected in trailing relation with the ridger 11 by means of a chain 18 which will permit a maximum of flexibility and freedom of movement for the blocker 10. The chain 18 may be secured to the frames 16 or 17 by any suitable means. In the present instance it is shown as attached to the forward one of three holes 19 provided in the frame 16. Should the frame 16 be swung outwardly to gather in a wider path, it will be understood that the chain 18 may be attached to one or the other of the more rearwardly disposed holes 19 so that it will follow more directly in line with the path covered by the earth gathering elements 13 and 14. At the trailing end of the chain 18 there is a drawbar frame 20 having fork-like ends 21 and 22 between which an earth gathering bucket 23 is turnably secured. Pivotally mounted upon the drawbar frame 20 there is a transversely extending latch bar 24 which, as will hereinafter appear, will operate to retain the earth gathering bucket 23 in an earth gathering position. The latch bar 24 also has an upstanding arm 25 to which a pull-cord 26 is attached and by which the latch bar 24 may be operated by the driver of a tractor or other means being used to tow the ridger 11.

As is more clearly shown in Figures 2 and 3 of the drawing, the earth gathering bucket 23 is provided with oppositely extending stub shafts 27 and 28 at its sides that are respectively engaged by the fork-like ends 21 and 22 of the drawbar frame 20. The fork-like ends 21 and 22 of the drawbar frame 20 are also shown as having upwardly projecting brackets 29 and 30 between which the transversely extending latch bar 24 is pivotally mounted. As is more clearly shown in Figure 3, the upstanding bracket 30 also carries a rearwardly projecting arm 31 that carries a latch retaining spring 32 which serves to return the latch bar 24 to its operative position whenever the pull-cord 26 is released by the operator. This arm 31 also has an inturned end 33 that forms a stop for holding the latch bar 24 in an operative position against the bias exerted by the spring 32. It will also be here noted that the location of the oppositely disposed stub shafts 27 and 28 is rearwardly of the vertical center of the earth gathering bucket 23 and that the earth gathering bucket 23 is provided with upwardly disposed runners 34 and 35 at its ends which have flat and angularly disposed surfaces that extend at an angle to each other and are located at different distances from the axis about which the earth gathering bucket 23 turns or tumbles. For example, the runner 35, as here shown, has a forward angular surface 36 the ends of which come within an arc "A" scribed about the center of the stub shaft 28, and a second surface 37 which, like the rear end of the earth gathering bucket 23, falls within an arc "B" also described about the center of the stub shaft 28. Because of this disposition of the stub shafts 27 and 28 with respect to the body of the earth gathering bucket 23 and the disposition of the flat angularly disposed surfaces 36 and 37 upon the runners 34 and 35 so that they form an apex which is disposed forward of the axis of the bucket 23, it will be readily seen that when the earth gathering bucket 23 is released and in motion through traction exerted thereupon by the drawbar frame 20, it will first tumble or turn slowly about the radius "A" to complete its earth discharging operation and immediately following this operation, the bucket 23 will be supported upon the flat surfaces 37 of the runners 34 and 35 and, as these surfaces and the rear end of the bucket roll over the ground, the earth gathering bucket 23 will be caused to return more rapidly to its earth gathering position where it will be again latched by the latch bar 24. At this point it should be noted that the latch bar 24 carries latching abutments, hereinafter designated by the numeral 40, which are formed by bending the depending ends of the latch bar 24 inwardly at an angle so as to provide a receding surface over which abutment engaging rollers 39 carried by the earth gathering bucket 23 will roll as the latch bar 24 is operated into its bucket releasing position. This will result in a positive and easy release of the earth gathering bucket 23 when it is loaded. As will be seen from an inspection of Figure 3, when the latching abutments 40 of the latch bar 24 move to the left or clockwise, the latch engaging rollers 39 carried by the bucket 23 will move relatively in a clockwise direction and roll over the receding surfaces provided upon the latching abutments 40. It will also be here noted that the drawbar 20 carries an upwardly extending coupling plate 42 having several apertures 43 to which the trailing end of the chain 18 may be attached and by which the angle at which the drawbar may be held to determine the earth gathering characteristics of the bucket 23 when in operation.

By now referring to Figure 4 of the drawing it will be noted that the trailing ends of the runners 34 and 35 extend down around the rear side of the earth gathering bucket 23, and at their forward ends they are twisted at a right angle to form a portion which extends downwardly inside the end walls of the bucket 23 near their leading open side where they may be securely fastened either by rivets or by welding. Secured upon the leading ends of the runners 34 and 35 and projecting outwardly beyond the ends of the earth gathering bucket 23 there are fixed studs 38 which carry the rollers 39 that are adapted to cooperate with the latching abutments 40 that extend inwardly from the lower ends of the latch bar 24. In this particular arrangement the brackets 29 and 30 are shown as welded to the fork-like ends 21 and 22 of the drawbar frame 20 and the latch bar 24 is shown as pivotally mounted upon a suitable stub shaft 41.

It is believed that the operation of my improved irrigation blocker will be understood from the above. However, it may be added that when the earth gathering bucket 23 is loaded, the weight of the load being carried thereby will be disposed forward of the off-center axis about which the bucket is designed to tumble and, as a result, it will be seen that immediately following an operation of the latch bar 24 by a pull upon the cord 26, the earth gathering bucket 23 will be free to tumble over, discharge its contents, and return to its initial earth gathering position. At this point it is important to note that during the tumbling operation of the bucket 23, the upward disposition of the runners 34 and 35 will cause the earth gathering bucket 23 to be lifted up so that it will quickly discharge its contents and pass thereover, thus leaving the load of earth at a definite point where it may be most needed.

While I have, for the sake of clearness and in order to disclose the invention so that the same can be readily understood, described and illustrated specific devices and arrangements, I desire to have it understood that the invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. In an irrigation ridge blocker of the character described, the combination of a drawbar frame, a latching means carried by said drawbar frame for holding a tumbling bucket in an earth gathering position, an earth gathering bucket turnably connected to said drawbar frame and adapted when unlatched to tumble completely over and return to its original latched position, said bucket being turnable about an axis extending transverse to the direction of movement of said drawbar frame, an upstanding bucket supporting runner at each side of said bucket having two flat angularly disposed surfaces which meet to form an apex in said runners substantially centrally above the top of said bucket, and said bucket being journaled upon said drawbar frame at a point rearwardly of the apex of said runner, whereby during the dumping portion of its tumbling movement said bucket will turn at a different rate than during its return to a normal earth gathering position.

2. In an irrigation ridge blocker of the character described, the combination of a drawbar frame adapted to trail behind a ridging plow, a latch pivotally mounted upon said drawbar frame having latching means for holding a tumbling bucket in an earth gathering position, a rectangular earth gathering bucket pivotally journaled at its sides upon said drawbar frame and adapted when unlatched to turn completely over in returning to its latched position, said bucket being turnable about an axis located rearwardly of its vertical center line, and an upstanding apex forming runner at each side of said bucket having flat sides forming said apex located at different distances from and tangent to arcs of different radii scribed about the axis about which said bucket turns, the apex of said runner being disposed forward to the axis about which said bucket turns when in its earth gathering position, whereby when unlatched said bucket will be raised and turned at a slower rate during the dumping portion of its movement than during its recovery and return to a normal earth gathering position.

KENNETH D. PRIESTLEY.

REFERENCES CITED

The following references are of record in the file of this patent:

UNITED STATES PATENTS

| Number | Name | Date |
|---|---|---|
| 1,402,460 | Terry | Jan. 3, 1922 |
| 1,410,204 | McCauley | Mar. 21, 1922 |
| 1,685,487 | Hale | Sep. 25, 1928 |
| 1,714,118 | Armington | May 21, 1929 |
| 1,734,347 | Rose | Nov. 5, 1929 |
| 1,750,132 | Rose | Mar. 11, 1930 |
| 2,158,340 | Spieth | May 16, 1939 |